UNITED STATES PATENT OFFICE.

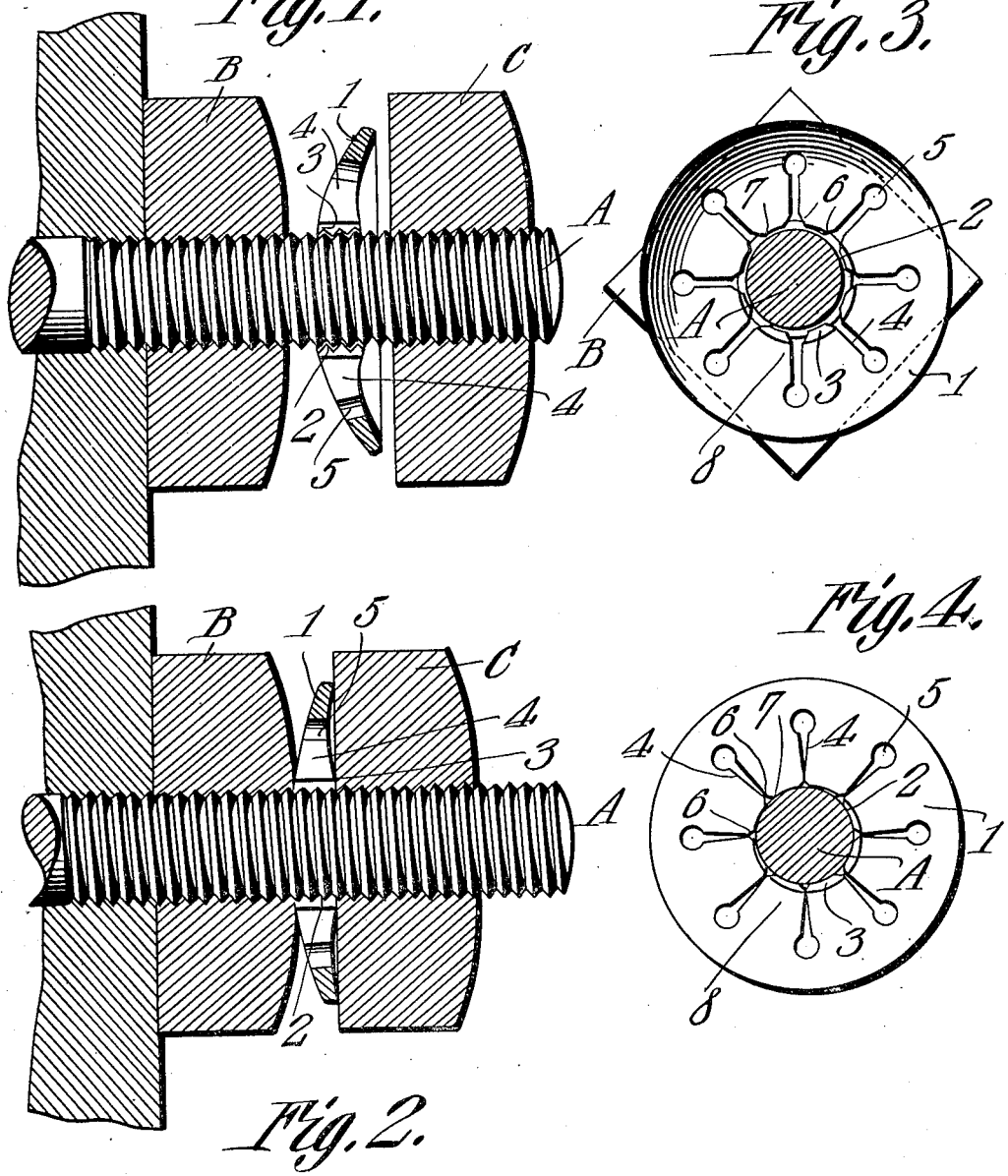

ORLANDO CRITTENDEN, OF ASHLAND, OHIO.

NUT-LOCK.

No. 916,421.   Specification of Letters Patent.   Patented March 30, 1909.

Application filed October 9, 1908. Serial No. 456,944.

*To all whom it may concern:*

Be it known that I, ORLANDO CRITTENDEN, a citizen of the United States, residing at Ashland, in the county of Ashland and State of Ohio, have invented a new and useful Nut-Lock, of which the following is a specification.

This invention relates to nut-locks and its object is to provide a device of this character in which a washer is utilized both for gripping the bolt and retaining a nut upon the bolt.

Another object is to provide a washer designed to be screwed upon the bolt and to be clamped between nuts upon the bolt, such clamping action causing the washer to frictionally engage the bolt and thus prevent independent rotation of the bolt and washer and also prevent the clamping nuts from being accidentally detached from the bolt.

A further object is to provide a locking washer of this type which has its bolt-engaging faces so formed as to cut into the thread of the bolt should an effort be made to rotate the washer independently of the bolt.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a section through the locking washer and the nuts arranged upon a bolt, said parts being shown in the positions occupied by them prior to the clamping of the washer. Fig. 2 is a view similar to Fig. 1, showing the washer clamped between the nuts and engaging the bolt. Fig. 3 is a face view of the washer in its normal position, the bolt being shown in section therein. Fig. 4 is a view similar to Fig. 3, but showing the relative positions of the washer and bolt when the said washer is clamped between two objects.

Referring to the figures by characters of reference "A" designates a bolt on which are threaded nuts "B" and "C". Threaded on the bolt between these two nuts is a locking disk or washer 1, which is concavo-convex as indicated in Fig. 1, and is provided with a central opening 2, the wall of which is screw-threaded so as to engage the thread on the bolt "A". That portion of the disk surrounding the opening 2 is thickened as indicated at 3 so that a threaded surface of increased area may be produced around the opening 2. Moreover this thickened portion 3 constitutes a stop or abutment as will be hereinafter set forth. A number of slots 4 are arranged radially within the disk 1, said slots extending from the central opening 2 toward the margin of the disk. These slots intersect the threads within the opening 2 and are enlarged at their outer ends as indicated at 5, while the walls of the slots diverge inwardly at their inner ends as indicated at 6 so as to produce biting edges 7 for the purpose hereinafter set forth.

When it is desired to use the device here described the nut "B" is first screwed on the bolt "A" until it is brought against the object to be secured and the disk 1 is then also screwed onto the bolt until its convex face is brought against the nut "B". The nut "C" is then also screwed onto the bolt and against the other face of the disk. By tightening this nut "C" the disk 1 will be tightly clamped between the two nuts and will flatten out to a limited extent, as indicated in Fig. 2, this resulting in the tongues 8, which are formed between the slots 4, pressing inwardly against the bolt "A" and frictionally engaging it to such an extent as to positively prevent independent rotation of the bolt and disk. By providing the central thickened portion 3 the nut "C" will be caused to bear there-against after the disk has been clamped to a sufficient extent, and the disk is thus prevented from buckling. Should any attempt be made to rotate the disk independently of the bolt "A", the edges 7 of the disk will bite into the thread on the bolt "A" and thus positively prevent any such action. While the disk is clamped between the two nuts "B" and "C," it of course positively prevents the nut "B" from being unscrewed, and, by pressing against the outer nut "C" will also hold it against rotation.

It is to be understood that the locking disk herein described is to be formed of tempered steel or other suitable hard, resilient material.

Of course various changes may be made in the size and proportions of the lock without departing from the spirit or sacrificing the advantages of the invention.

What is claimed is:—

1. A nut lock comprising a concavo-convex disk having a central apertured thickened portion, there being threads within the aperture, said disk being provided with radial slots intersecting the threads and forming tongues there-between, the peripheral portion of the washer constituting a bearing for a clamping nut and being shiftable to move the tongues toward each other, the thickened inner ends of the tongues constituting means for limiting the movement of said clamping nut when the limit of contraction of the washer has been reached.

2. The combination with a bolt and a fixed and a movable clamping member thereon, of a nut lock upon the bolt and interposed between said members, said lock comprising a concavo-convex disk having a central thickened apertured portion screw-threaded and engaging the bolt, said thread being intersected by radial slots formed within the disk, there being tongues between the slots, the peripheral portion of the washer constituting a bearing for the movable clamping member and being shiftable by said member to move the tongues together and upon the bolt to clamp the bolt, said inner ends of the tongues constituting means for limiting the movement of the movable clamping member.

3. The combination with a bolt and a fixed and a movable clamping member thereon, of a nut lock upon the bolt and interposed between said members, said lock comprising a concavo-convex disk having a central thickened apertured portion screw-threaded and engaging the bolt, said thread being intersected by radial slots formed within the disk, there being tongues between the slots, the peripheral portion of the washer constituting a bearing for the movable clamping member and being shiftable by said member to move the tongues together and upon the bolt to clamp the bolt, said inner ends of the tongues constituting means for limiting the movement of the movable clamping member, the inner ends of the walls of the slots within the washer diverging inwardly to form biting edges for engagement with the bolt when the washer is contracted.

In testimony that I claim the foregoing as my own, I have hereto affixed my signature in the presence of two witnesses.

ORLANDO CRITTENDEN.

Witnesses:
JAS. M. WALKER,
HERBERT D. LAWSON.